United States Patent Office 3,345,359
Patented Oct. 3, 1967

3,345,359
PERFLUORO-3-AMINODIAZIRIDINE AND ITS PREPARATION
William Charles Firth, Jr., Stamford, Conn., assignor to American Cyanamid Company, Stamford, Conn., a corporation of Maine
No Drawing. Filed June 28, 1962, Ser. No. 207,153
10 Claims. (Cl. 260—239)

This invention relates broadly to a new and useful fluorinated compound, more particularly perfluoro-3-aminodiaziridine, and to a method of preparing the same. Still more particularly the invention is concerned with the production of fluorinated compounds including perfluoro-3-aminodiaziridine by bringing perfluoroguanidine into reactive relationship with an alkali-metal (e.g., rubidium, cesium, potassium, etc.) fluoride or a mixture of such fluorides in any proportions.

Perfluoroguanidine, the formula for which is

I
$$F_2N-\overset{\overset{N}{\|}}{C}-NF_2$$

and hereafter for brevity often referred to as "PFG," can be obtained, for example, by the fluorination of biguanide using the so-called "fluid-bed" technique as is more fully described in the copending application of Simon Frank and Douglas M. Meyers, Ser. No. 195,023, filed May 11, 1962, and assigned to the same assignee as the present invention. In the method there described 1,1-difluorocyanamide is produced and, ordinarily also, perfluoroformamidine and perfluoroguanidine.

No pertinent prior art is known. Miller et al. [J. Am. Chem. Soc., 83, 1767–8 (1961)] disclose that reaction takes place between cesium fluoride and perfluorodienes at moderate temperatures in the absence of a solvent to yield perfluorodialkylacetylenes.

The properties of a typical sample of perfluoroguanidine are given in Table I.

TABLE I

Molecular weight (by gas density): Calc'd., 149; found, 141±5.
Boiling point: $-2\pm2°$ C. by extrapolation from $$\log P_{mm} = 8.07 - \frac{1410}{T}$$

$F^{19}$ nuclear magnetic resonance spectrum:

| $\phi$ (in p.p.m.) | Appearance** | Area Ratio | Assignment |
|---|---|---|---|
| −47.2 | m, broad | 2 |  |
| −42.3 | m, broad | 2 | *F$_2$NC$\overset{NF}{\diagup}$ |
| −20.5 | w, broad | 1 | C=N$\overset{F}{\diagup}$ |

*Indicates group considered.
**m=medium; w=weak.

The present invention is based on my discovery that perfluoro-3-aminodiaziridine, the formula for which is II

and which is an isomer of perfluoroguanidine, can be produced by bringing perfluoroguanidine into reactive relationship with alkali-metal fluoride, advantageously rubidium fluoride, cesium fluoride or potassium fluoride, as briefly described in the first paragraph of this specification and more fully hereafter. The $F^{19}$ nuclear magnetic resonance spectrum of perfluoro-3-aminodiaziridine (hereafter often referred to as "PFADA") shows that there are four kinds of bonded fluorine present in the compound at fields suggestive of NF$_2$, N—F (two groups) and C—F. The NMR spectrum, together with the infrared spectrum, suggests that the cyclic diaziridine structure is the most reasonable of the three structures, one of which is that shown in Formula II, and the others of which are as follows:

III
$$F-\overset{\overset{NF_2}{\|}}{\underset{N-NF_2}{C}}$$

IV
$$F-\overset{\overset{F}{|}}{\underset{\underset{N-F}{\overset{N}{\|}}}{C}}-NF_2$$

The infrared spectrum of the isomer obtained by the method of this invention is consistent with these assignments. The isomer has only one C—F band at this characteristic low frequency. It also has a characteristic band at about 11.1μ, which it seems reasonable to assign to the NF group. Furthermore, the isomer has a more complex spectrum in the N—F region than does the cyclic diaziridine obtained by the isomerization of perfluoroformamidine using the same general technique and isomerization catalyst, as one would predict from the respective structures.

The $F^{19}$ nuclear magnetic resonance spectrum of the isomer of PFG obtained by the method of this invention is given in Table II.

TABLE II.—$F^{19}$ NUCLEAR MAGNETIC RESONANCE SPECTRUM OF ISOMER OF PFG

| $\phi$ (in p.p.m.) | Appearance | Area Ratio | Assignment |
|---|---|---|---|
| −30.4 | m, broad | 1.9 | NF$_2$ |
| −23.2 | w, broad | | "R" impurity* |
| +24.1 | w, broad | 1 | 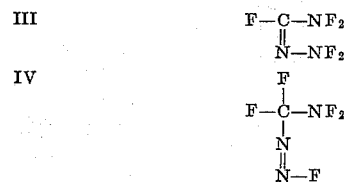 |
| +32.7 | 2, broad | 1 | |
| +138.2 | w, sharp | | "R" impurity |
| +159.2 | m, slightly broadened | 1 | F−C$\overset{\diagup}{\diagdown}$ |

*About 3 mole percent.

The mass spectrum of the isomer of PFG resulting from the method of this invention is shown in Table III.

TABLE III.—MASS SPECTRUM OF THE ISOMER (PFADA) OF PFG

| M/e | Pattern | Possible Cation |
|---|---|---|
| 97 | 11 | CN$_2$F$_3$ |
| 83 | 45 | CNF$_3$ |
| 69 | 25 | CF$_3$ |
| 64 | 91 | CNF$_3$ |
| 52 | 13 | NF$_2$ |
| 50 | 21 | CF$_2$ |
| 45 | 20 | CNF |
| 33 | 26 | NF |
| 31 | 100 | CF |
| 28 | 69 | N$_2$ |
| 20 | 19 | HF |
| 19 | 6 | F |

Any suitable means can be employed in bringing the perfluoroguanidine reactant into contact with the alkali-metal fluoride reactant. Good results have been obtained by bringing the PFG into contact with the alkali-metal fluoride while the former is in liquid state and then allowing it to reach ambient temperature (room temperature), e.g., 20°–30° C., or even about 40° C. Thus, the temperature of reaction may range, for example, from about −132° C. to ambient temperature.

If desired, gaseous PFG can be passed upwardly or downwardly through a bed of alkali-metal fluoride in divided state or form. Or, it may be passed through a plurality of inlet ports or openings whereby the gaseous PFG reactant is introduced at a plurality of points into a bed of the alkali-metal fluoride contained in a suitable reactor, and the gaseous products of the reaction are withdrawn from the reactor along with any unconverted PFG. The reaction can be carried out continuously, semi-continuously or by batch technique, and at atmospheric or superatmospheric pressure.

The alkali-metal fluoride may be of any suitable size or shape, for example in finely divided state such as of from 50 to 100-mesh fineness; or in the form of larger particles (coarser than 50-mesh), beads, pellets, etc.

The time of contact of the PFG reactant with the alkali-metal fluoride reactant can be varied as desired or as conditions may require depending, for example, upon such influencing factors as, for instance, the design of the reactor; whether or not the operation is continuous, semi-continuous or batch; the size, shape, surface area, etc., of the alkali-metal fluoride; temperature and/or pressure at which the reaction is effected; and other influencing conditions. For example, when the reaction is carried out continuously with the PFG in the gaseous state the time of contact may be from less than a minute (e.g., about ¼ minute) to 10 or 15 minutes or more. In batch operations the contact time may range, for instance, from 10 or 15 minutes to 24 hours or more.

Usually it is advantageous that the alkali-metal fluoride be in anhydrous (substantially completely anhydrous) state. By "anhydrous" alone or "substantially completely anhydrous" as used herein with reference to the alkali-metal fluoride reactant is meant one which contains no more than a trace of water or the amount of water that might be present in the commercial product. The amount of water should not be such as would adversely affect the course of the reaction or the constitution of the reaction product.

The amount of the alkali-metal fluoride ingredient or reactant with respect to the PFG reactant is not critical, and may be varied as desired or as conditions may require. The alkali-metal fluoride functions as a conversion catalyst.

If desired, the PFG reactant may be diluted with an inert material, e.g., an inert carrier material in gaseous or other state. Examples of such diluents that can be used are, for instance, helium, argon, nitrogen, neon, bis(difluoroamino)difluoromethane, etc. The concentration of the PFG in the diluent can be varied as desired or as conditions may require, e.g., from 1:99% by volume of PFG to 99:1% by volume of the diluent material.

In order that those skilled in the art may better understand how the present invention can be carried into effect, the following examples are given by way of illustration and not by way of limitation. All parts and percentages are by weight unless otherwise indicated.

*Example 1*

A 27-ml. reactor was charged with 5.0 g. of anhydrous, finely divided rubidium fluoride and 0.7 mmole of PFG. After standing for 3 hours at −80° C., the products were separated from the rubidium fluoride (without warming) by bulb-to-bulb distillation and measured. The product gases from each run were condensed at −132° C. (thereby avoiding the possibility of explosions sometimes encountered when condensed at −196° C.), and were then used at the next higher temperature. The reaction conditions and the mmoles of gas at the start and end of each 3-hour period are shown below:

| Reaction | | Mmoles of Gas | |
|---|---|---|---|
| Time, hours | ° C. | Start | End |
| 3 | −80 | 0.70 | 0.66 |
| 3 | −45 | 0.60 | 0.57 |
| 3 | −23 | 0.52 | 0.48 |

Infrared examination of the −132° C. condensate from the last of the three runs showed mostly PFG, some perfluoro-3-aminodiaziridine (PFADA), carbon tetrafluoride and an unknown impurity.

The product of the −23° C. reaction was stored in a 6 ml. reactor with 3.0 g. of anhydrous, finely divided rubidium fluoride for 3 hours at −7° C. No pressure drop occurred during the reaction. Infrared analysis of the product gas indicated the presence of PFADA, carbon tetrafluoride, tris(difluoroamino)fluoromethane, and probably some PFG.

In another series of runs, the details of which are given in Table IV, a dry reactor (of appropriate volume to give the pressures shown in Table IV) was charged in a dry box with 5.0 g. of anhydrous, finely divided rubidium fluoride, evacuated and then PFG (amount shown in Table IV) was condensed in with a −132° C. bath. The reactor was isolated from the rest of the vacuum system and allowed to warm to room temperature (20°–30° C.) over 10 to 15 minutes. After the reaction time shown in the table, the total product gas was measured and separated into −132° C. and −196° C. condensates. During the fractionation the −196° C. trap was pumped on to remove any non-condensable gases. The −196° C. condensate was shown by infrared and mass spectrometric analysis to be mostly a mixture of carbon tetrafluoride, difluorodiazine (both isomers) and carbon dioxide. The −132° C. condensate was mostly perfluoro-3-aminodiaziridine, but Cady et al. fractional co-distillations [G. H. Cady and D. P. Siegworth, Anal. Chem., 31, 618 (1959)] were necessary to remove both higher and lower boiling fractions.

The reaction conditions and results of the runs are summarized in Table IV.

TABLE IV

| Example | Reaction Time, hrs. | RbF, grams | Calculated PFG Pressure, mm. | Mmoles PFG | Mmoles Product | −80° C. Condensate | −132° C.* Condensate | −196° C.** Condensate |
|---|---|---|---|---|---|---|---|---|
| 2 | 4 | 5.0 | 9 | 0.11 | 0.12 | Undetermined | (PFADA+N$_2$F$_2$, and probably CF$_4$ plus an unknown impurity). | |
| 3 | 3 | 5.0 | 117 | 0.93 | | do | 0.65 mmole | 0.24 mmole. |
| 4 | 3 | 5.0 | 620 | 0.89 | 1.0 | None | 0.56 mmole | 0.30 mmole. |

*Largely perfluoro-3-aminodiaziridine (PFADA).
**Largely CF$_4$, CO$_2$, N$_2$F$_2$, all isomers).

In Table V are given the reaction conditions and the results of three other runs wherein PFG was reacted with an anhydrous, finely divided alkali-metal fluoride, specifically rubidium fluoride (Example 5), cesium fluoride (Example 6) and potassium fluoride (Example 7). The apparatus and procedure were essentially the same as that employed in the runs of Examples 2, 3 and 4 and which were described in the portion of this specification immediately prior to the said examples.

TABLE V

| Example | Mmoles of PFG | Grams Alkali-Metal Fluoride | Reaction Time | Mm. Pressure in Reactor (Calcd.) | Increase or Decrease in Mmoles of Gas | Products |
|---|---|---|---|---|---|---|
| 5 | 0.18 | 5.0 (RbF) | 13 min | 15 | No change | PFADA; PFG; some C–F absorption at 7.8–7.9μ. |
| 6 | 0.26 | 1.0 (CsF) | 5½ hrs. * | | do | Largely PFADA; small amounts of unidentified materials. |
| 7** | 0.70 | 5.0 (KF) | 18 hrs | 60 | 0.05 mmole increase | PFADA and unidentified materials. |

*The reactor was allowed to warm slowly (over a period of 5½ hours) from −30° C.
**In Example 7, PFG was admitted as a gas to the evacuated reactor containing the potassium fluoride.

The following example shows one use of perfluoro-3-aminodiaziridine, more particularly as an intermediate in chemical synthesis.

*Example 8*

About 0.2 mmole of PFADA was reacted at room temperature with 1 ml. of 100% $H_2SO_4$ in a Pyrex reactor to yield carbonyl fluoride and small amounts of silicon tetrafluoride, carbon tetrafluoride and difluoroamine.

In addition to the foregoing example it may also be mentioned that PFADA is highly reactive as shown by its complete decomposition to unidentified compounds after one month in a Pyrex® nuclear magnetic resonance tube (i.e., an NMR tube) containing Freon® 11.

PFADA is an explosive. Thus, when a purified sample of PFADA was being condensed at −196° C. into an NMR tube, the material exploded.

PFADA also is useful as an oxidizer and as an intermediate in the synthesis of other oxidizers. Such oxidizers are particularly useful in rocket-propellant compositions.

I claim:
1. Perfluoro-3-aminodiaziridine.
2. The method of preparing fluorinated compounds including perfluoro-3-aminodiaziridine which comprises reacting together perfluoroguanidine and an alkali-metal fluoride.
3. A method as in claim 2 wherein the alkali-metal fluoride is rubidium fluoride.
4. A method as in claim 2 wherein the alkali-metal fluoride is cesium fluoride.
5. A method as in claim 2 wherein the alkali-metal fluoride is potassium fluoride.
6. A method as in claim 2 wherein the reaction mass is at a temperature ranging from about −132° C. to ambient temperature during the reaction period.
7. The method of preparing fluorinated compounds including perfluoro-3-aminodiaziridine which comprises reacting together perfluoroguanidine and an alkali-metal fluoride at a temperature ranging from about −132° C. to ambient temperature during the reaction period; and isolating perfluoro-3-aminodiaziridine from the resulting reaction mass.
8. A method as in claim 7 wherein the alkali-metal fluoride is rubidium fluoride.
9. A method as in claim 7 wherein the alkali-metal fluoride is cesium fluoride.
10. A method as in claim 7 wherein the alkali-metal fluoride is potassium fluoride.

References Cited

UNITED STATES PATENTS 3,257,381    6/1966    Meyers et al. _____ 260—239

ALTON D. ROLLINS, *Primary Examiner.*

OSCAR R. VERTIZ, *Examiner.*

J. W. WHISLER, *Assistant Examiner.*

UNITED STATES PATENT OFFICE
CERTIFICATE OF CORRECTION

Patent No. 3,345,359                                                  October 3, 1967

William Charles Firth, Jr.

It is hereby certified that error appears in the above numbered patent requiring correction and that the said Letters Patent should read as corrected below.

Column 1, lines 20 to 22, the formula should appear as shown below instead of as in the patent:

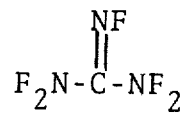

column 2, TABLE II, last column, the first formula should appear as shown below instead of as in the patent:

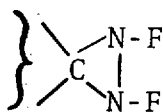

same table, second column, line 4 thereof, for "2, broad" read -- w, broad --; column 4, lines 34 and 35, for "carbaron" read -- carbon --; columns 5 and 6, TABLE V, in the first footnote, for "from -30° C." read -- from -132° C. to -30° C. --.

Signed and sealed this 26th day of November 1968.

(SEAL)
Attest:

EDWARD M. FLETCHER, JR.
Attesting Officer
                                       EDWARD J. BRENNER
                                       Commissioner of Patents